United States Patent [19]

Edwards

[11]  4,046,642

[45]  Sept. 6, 1977

[54] METHOD OF MAKING ELECTRIC STORAGE BATTERIES

[75] Inventor: William Howard Edwards, Bolton, England

[73] Assignee: Chloride Group Limited, London, England

[21] Appl. No.: 722,123

[22] Filed: Sept. 10, 1976

[30] Foreign Application Priority Data

Sept. 11, 1975  United Kingdom ............... 37405/75

[51] Int. Cl.² .......................................... H01M 10/44
[52] U.S. Cl. ................................................ 204/2.1
[58] Field of Search ................. 204/2.1; 429/225–228; 29/623.1–623.5

[56] References Cited

U.S. PATENT DOCUMENTS

| | | | |
|---|---|---|---|
| 2,996,563 | 8/1961 | Haebler | 429/225 |
| 3,887,398 | 6/1975 | Singman | 429/228 |
| 3,948,680 | 4/1976 | Mao | 429/225 X |

*Primary Examiner*—C. F. LeFevour
*Attorney, Agent, or Firm*—Oblon, Fisher, Spivak, McClelland & Maier

[57] ABSTRACT

A method of generating electrochemical activity in positive plates of Plante cells is disclosed. An agent corrosive to the unformed pure lead positive plate is incorporated in the electrolyte and the cell charged, the corrosive agent being selected to be destroyed by the anodic conditions at the negative plate at the end of the charging cycle. Nitrate ions are preferred.

9 Claims, No Drawings

METHOD OF MAKING ELECTRIC STORAGE BATTERIES

The present invention relates to lead acid electric storage cells of the Plante type and to methods of electrolytic formation of the positive plates of such cells.

The positive plate of a Plante cell has its electrochemical activity provided by pure lead either in the form of a grid or sheet or as inserts in an antimonial lead support plate. One form of these inserts is the so called "Rosette" which is a flat crimped coil.

The pure lead is rendered electrochemically active by having its surface pitted and corroded by a powerful oxidizing agent with a view to obtaining a final surface layer of lead dioxide in electrical contact with the underlying uncorroded lead.

The main method currently used in production is to anodically attack sheet lead plates with a solution of sulphuric acid and potassium perchlorate using controlled current and temperature conditions.

However this leaves perchlorate ions between the lead dioxide and the underlying metal and this perchlorate cannot be readily removed. If the perchlorate ions were not removed they would continue to corrode the plate which could collapse before the end of the service life of the battery. The plate thus has to be cathodically reduced to lead, removed from the formation electroylte bath, and washed in water to remove the perchlorate ion contamination. The lead plate which now has a pitted and open surface is then dried and the surface oxidizes to lead monoxide during this step. The plate is then charged in dilute sulphuric acid solution to convert the pitted lead with its lead monoxide surface layer to lead dioxide.

The plate is then removed from the electrolyte formation bath dried and placed in the cell container with other so treated positives and negatives and separators and the lids placed on and the electrolyte added.

This is a complicated procedure and in addition prohibits the plates having their full formation procedure carried out in the container in which they will be used, the so-called "jar formation."

It is an object of the present invention to provide a method for total jar formation of the positive plates of Plante cells.

We have discovered that if a mixture of nitric acid or nitrates and sulphuric acid is placed in the container the pure lead of the positive plate can be converted to a satisfactory electrochemically active structure and the cell used without further treatment, provided the amount of nitric acid and the duration of the charging current used are such as to ensure that all the nitric acid is destroyed. It is believed that it is largely converted to ammonium sulphate, which can be left in the cell. The electrolyte could be decanted and replaced if desired but this is not necessary.

Indeed with large stationary batteries which have to be assembled on site, replacement of the electrolyte would present considerable problems and be a positive disadvantage.

Thus according to the present invention a method of making a Plante lead acid cell which comprises electrolytic formation of the positive plate in a sulphuric acid solution is characterised in that the positives in electrolytically unformed or only partially formed condition are assembled with negative plates and separators into the battery container, the container filled with sulphuric acid electrolyte and an amount of a corroding agent having a powerful corrosive action on lead under anodic conditions and reducible under the final cathodic condition at the corresponding negative plate to ionic species which do not interfere with the cell reactions, is incorporated into the cell, such as to convert the lead surface to an extended surface area and provide a sufficient mass of lead dioxide at the said extended surface, and subjecting the positive plates to anodic conditions so as to convert the lead surface to an extended surface area and provide a sufficient mass of lead dioxide at the said extended surface, the treatment being for a time sufficient under the cathodic conditions at the negative plates, to convert all of the said corroding agent to the non interfering ionic species.

This conversion step is thought to occur essentially at the end of the charging cycle when all the lead dioxide on the negative plate has been converted to metallic lead and the negative plate is in the gassing condition or would be gassing if the corroding agent was not present.

We prefer to use an oxidizing corroding agent, such as a nitrogen oxide acid reducible to the ammonium ion, and have obtained satisfactory results using nitric acid as the corroding agent; nitrates could also be used.

We have found however that acetic acid fails to develop any significant capacity.

Clearly any corroding agent fulfilling those requirements could be used instead of nitric acid. The non interfering ionic species must of course also be non corrosive to lead at least under normal battery use conditions.

The amount of corroding agent used must be sufficient to achieve the necessary corrosion and pitting of the lead surface so as to produce the required extended surface area and thus cell capacity, but clearly must not be such as to destroy the structural integrity of the positive plate.

Thus when using nitric acid a preferred initial composition for the electrolyte in the container is at least 0.2% preferably 0.2 to 4.0% especially 0.5 to 2.5% and more preferably 0.8% to 1.5% by weight of 1.415 specific gravity nitric acid in 1.200 specific gravity battery purity sulphuric acid. This is equivalent to 0.2% to 4.0% weight by volume nitric acid in 1.200 specific gravity sulphuric acid.

In an alternative form of the invention the nitric acid is incorporated in the form of nitrates of non interfering cations, e.g., alkali metal or lead or ammonium.

Battery purity sulphuric acid of 1.215 specific gravity typically contains not more than 0.005% by weight of ammonium ion, and not more than 0.0005% by weight of nitrates.

The ammonium ion content may increase in value during use of the battery due to reduction of any nitrates present to ammonia.

The nitric acid or nitrates present in the cell in accordance with the present invention is reduced to ammonium ions during the electrolyte formation by which the pure lead positives are converted to lead dioxide (and the negatives to spongy lead in conventional manner). Thus the electrolyte in a cell in accordance with the present invention should contain at least equivalent molar proportions of ammonia to the original molar proportions of nitric acid i.e., at least $(0.5/63) \times 10$ molar, i.e., 0.08M.

We find that in fact about 60% of the nitric acid is converted to ammonia which remains in the electrolyte at the end of the electrolytic formation. We believe that this loss of nitrogen may be due to conversion of the nitric acid to nitrogen oxides by reaction with the lead before the electolyte formation commences. Alternatively some may be lost as nitrogen gas during the electrolytic reduction.

The maximum molar proportion of ammonium ions in conventional battery electrolyte from the above figures is $(0.005 \times 1.2 \times 10)/17 = 0.0035$ M and the nitrate content even if fully converted to ammonium ions, is only 0.0001 M.

The charging conditions used must also be such as to ensure the correct degree of corrosion whilst also ensuring that all the oxidizing agent in the electrolyte is converted to the non interfering ionic species.

We prefer to use charging conditions in which the capacity input is 5 to 8 times the cell 10 hour rated capacity, e.g., for a cell with 10 hour capacity of 30 ampere hours we prefer to charge to 180 Ah (6 times the 10 hour capacity) at 4.5 amps (0.15 times the 10 hour capacity). More broadly we prefer to charge at a constant current which is 0.10 to 0.25 times the 10 hour rated capacity.

Conventional rates of charging are up to about 0.14 times the 10 hour rated capacity and as soon as the cells start to gas the rate is reduced, e.g., to 0.07. We prefer to use rates in the range 0.12 to 0.25 times the 10 hour rated capacity since this results in an increased rate of attack on the positives and an increased rate of destruction of the nitric acid, so shortening the process.

Alternatively the charging can be carried out with a constant potential. Thus, the number of cells is fixed, the voltage is fixed and a fixed resistance is incorporated in the charging circuit so that the circuit cannot deliver in excess of a preset current. As the voltage of the cells increases the current in the cells diminishes automatically.

The final voltage is 2.7 volts and thus for a cell of 40 ampere hour capacity the circuit is designed to start at a current of 10 amps and will have fallen to 4 amps at the end of the charging sequence.

Normal charging input would be 4 to 5 times the 10 ampere hour rated capacity. Thus we are using an excess charging input in the ratio 1.2:1 to 1.6:1. The ratio can go higher than this, e.g., up to 2:1 or more but clearly there is no need to extend the charging input beyond that needed to eliminate the nitric acid.

In a modification of this, the fixed resistance could be made smaller so that the final current was larger, or more cells could be incorporated in the charging circuit.

The above charging sequence has been found to give satisfactory results using 1.200 specific gravity sulphuric acid containing 0.8% w/v nitric acid. The electrolyte was free of nitric acid at the end of the charging which was carried out at 40° C, without cooling for 33 to 50 hours. This constituted a degree of overcharging of the cell.

The edges of the plates are protected with an acid resistant polymer coating having adequate adhesion to prevent deep anodic attack. Another possibility is for a clip on plastic member or a shrunk on plastic member to be located on the edge of the battery plate to insulate it from electrochemical anodic attack. Suitable polymers include epoxy resins and polyurethane resins.

This reduces the risk of flakes of lead dioxide forming at the plate edges and causing short circuits in use.

We prefer to use about 3 grams of nitric acid or nitrate (calculated as nitrate ion) in the cell per 10 ampere hours of capacity. Below 1 gm/10Ah the capacity is unacceptably low. The amount used could be higher, e.g., 4, 5, 6, 7, 8, 9 or even possibly 10 to 15 grams, e.g., in the range 3 to 15.

The invention may be put into practice in various ways and certain specific embodiments will be described to illustrate the invention with reference to the accompanying Examples.

EXAMPLE 1

A cell consisting of 4 Plante positive plates and 5 negative plates each 76.2 cms wide and 119.1 cms high were assembled in a cell with microporous polyvinyl chloride separators 3.9 mms thick between each plate. The cell contained 1420 ccs of electrolyte.

The electrolyte was made up from 1411.5 ccs (6.8N) battery purity 1.200 specific gravity sulphuric acid and 8.5 ccs of 1.415 specific gravity (15.8N) nitric acid, 1.415 specific gravity nitric acid contains 1000 grams of nitric acid per liter.

The sulphuric acid initially contained not more than 0.005% w/w ammonium ions (0.0035M) and not more than 0.0005% w/w nitrate ions (0.0001M). After addition of the nitric acid it contained 0.6% of nitrate (0.095M), this being the eventual theoretical molar concentration of the ammonium ions in the electrolyte after electrolytic formation.

The cell electrolyte was thus 1.200 specific gravity sulphuric acid containing 0.6% weight by volume nitric acid.

The positive plates were 7.26 mms thick overall and were plates cast with trapezoidal protuberances providing an actual surface area having a ratio to its projected surface area (762 × 119.1 sq cms) of 11 to 1.

More broadly we prefer to use plates in which this ratio is at least 9:1, e.g., in the range 9:1 to 14:1.

The negative plates are flat sided and faced and are 3.9 mms thick.

The negative plates are pasted grids containing 125 grams of leady oxide (40% lead 60% lead monoxide) per plate (in the wet pasted condition).

The cell has a rated 10 hour capacity of 30 ampere hours. It was charged to 180 ampere hours by being charged at 3.5 amps for 40 hours at 40° C without cooling.

The electrolyte contained no free nitric acid after charging but 0.055 moles of ammonium ions i.e., about 60% of the theoretical content of 0.6×10/63 moles of ammonium ion i.e., 0.095M equivalent to the original nitric acid.

EXAMPLE 2

Four cells were made up as in Example 1 but using 0.25% weight by volume of 1.415 specific gravity (15.8N) nitric acid (measured at 24° C).

The cells after formation had open circuit readings of 2.06 volts at 15° C and the electrolyte specific gravity at 15° C and 1.236.

The cells were then discharged at a current of 5.25 amps down to a cell voltage of 1.82 volts at 24° C. The cells had discharge durations for this, the first discharge, of 2.05 hours, 1.67 hours, 1.82 hours and 1.73 hours.

The specific gravity of the cells after discharge was 1.210 at 24° C.

EXAMPLE 3

Two cells were made as in Example 1 but using 1% weight by volume of 1.242 specific gravity nitric acid (measured at 24° C). The cells after formation had open circuit voltages of 2.21 volts at 15° C and the electrolyte specific gravity at 15° C was 1.210. The cells were then discharged as in Example 2; one, cell A, had a first discharge duration of 5.75 hours and the other, cell B, a first discharge duration of 5.68 hours. On recharging at 2.5 amps for 16 hours to the original cell voltage or 2.21 volts; cell A showed a second discharge duration under the same conditions of 5.92 hours and cell B, 6.00 hours.

EXAMPLE 4

Two cells were made as in Example 1 but using 2% weight by volume of 1.242 specific gravity nitric acid (measured at 24° C). 1.242 specific gravity nitric acid contains 500 grams of nitric acid per liter. The cells after formation had open circuit voltages of 2.03 volts and the electrolyte specific gravity at 15° C was 1.196.

The cells were then discharged as in Example 2 and had discharge durations of 5.33 hours.

EXAMPLE 5

Three cells were made as in Example 1, using 0.6% by volume of 1.415 specific gravity nitric acid.

The electrolyte specific gravity at 15° C was 1.210 at the end of charge and the electrolyte was free of nitric acid.

The cells were discharged as in Example 2; cell A had a first discharge duration of 4.25 hours, cell B duration was 5.15 hours, and cell C duration was 5.58 hours. The temperature was 18° C.

On recharging at 2.5 amps for 16 hours the duration on the second discharge was 4.97 hours for cell A; 5.52 hours for cell B, and 5.75 hours for cell C at 24° C.

The cells were discharged at 5.25 amps for 4 hours and recharged for 8 hours at 3.15 amps on eight occasions, and the capacity was determined as previously.

The capacity of cell A was 4.83 hours, of cell B was 5.53 hours and of cell C was 6.58 hours at 20° C.

EXAMPLE 6

Three cells were made as in Example 1, except that 0.8% volume by volume of 1.415 nitric acid in 1.200 specific gravity sulphuric acid was used.

The electrolyte specific gravity after charge was 1.210 and it was free of nitric acid.

The discharge was carried out as in Example 2 at 5.25 amps to 1.82 volts and capacities were 4.97 hours for cell A, 5.68 hours for cell B and 6.80 hours for cell C, at 18° C.

The cells were recharged at 2.5 amps for 16 hours and the capacity on the second discharge was 5.65 hours for cell A; 6.05 hours for cell B and 6.88 hours for cell C, at 24° C.

The cells were discharged at 5.25 amps for 4 hours and recharged at 3.15 amps for 8 hours on eight occasions and cell capacities on the 11th discharge were: 5.67 hours for cell A; 5.70 hours for cell B and 6.58 hours for cell C at 20° C.

The electrolyte was tested for the presence of nitrate at various stages of these cycles and nitrate was never detected.

EXAMPLE 7

Example 1 was repeated but using 1% volume by volume of 1.415 specific gravity nitric acid in 1.200 specific gravity sulphuric acid.

Comparison of 73 cells made in accordance with the procedure of Example 7 with 57 cells made by conventional perchlorate procedure described above indicated that the variance of the 5 hour capacity (26.25 Ah) of the cells in accordance with the present invention was significantly less than that of the conventional cells.

It was also found that open circuit losses for the cells in accordance with the invention were less than for standard cells whilst the cycle life was as good as that of standard cells.

EXAMPLE 8

A five plate 15 Ah capacity cell was made up in the same manner as the cell of Example 1. The plate weights were the same and the volume of electrolyte was 960 ccs. Thus there was a lot more electrolyte per Ah of capacity than in the 9 plate cells of Example 1.

Six cells were made up; two, Examples 8A and 8B, used 0.4% nitrate, two, Examples 8C and 8D, used 0.6% nitrate and two, Examples 8E and 8F, used 0.8% nitrate in the electrolyte and were charged to 96 ampere hours by being charged at 2 amps for 48 – 54 hours at 40° C. without cooling. The cells on discharging at 2.6A at 15° C to 1.82 volts had discharge durations of 7.75, 6.90, 7.90, 7.63, 7.84 and 7.75 hours respectively.

In Examples 8E and 8F it took 54 hours of charge at 2 amperes to eliminate the presence of nitrate.

EXAMPLE 9

Example 1 was repeated using negative plates containing 125 grams of conventional grey oxide wet active material each, with sodium nitrate and added to it so that the cell contained 15 grams of nitrate ions.

The electrolyte was made up from 1420 ccs (6.8N) battery purity 1.200 specific gravity sulphuric acid.

EXAMPLE 10

Example 9 was repeated except that instead of using sodium nitrate, the nitrate ions were supplied as nitric acid added to the grey oxide.

With both Examples 9 and 10 the nitrate ions were rapidly reduced in the negative plate as soon as charging commenced, voluminous quantities of $NO_2$ being given off. The positive plate was not converted to an extended surface area, the cells having capacities of only about 2% of their normal capacity which is similar to the level when no forming agent is used.

It is clear therefore that the nitrate ions should not be incorporated in the negative active material.

EXAMPLE 11

Example 1 was repeated except that the electrolyte was made up by adding solid sodium nitrite to cold 1.200 specific gravity sulphuric acid. Two cells were made up with 1% nitrite in the electrolyte and two cells were made up with 2% nitrite in the electrolyte. The cells were charged to 192 ampere hours by being charged at 4 amps for 48 hours at 40° C without cooling. The cells were discharged as in Example 1 and give discharge durations of 3.18, 5.17 and 4.58 hours respectively.

EXAMPLE 12

Ten cells were made up as in Example 1, the plates having a capacity of 45 Ah in 10 hours. The plate weights were the same as in Example 1, there being 6 positive plates and 7 negative plates. The electrolyte volume was 2800 ccs.

Four cells, Examples 12A, 12B, 12C and 12D, containing 1.0% nitrate; four cells, Examples 12E, 12F, 12G and 12H, containing 1.2% nitrate and two cells, Examples 12J and 12K, containing 1.4% nitrate in the electrolyte were made up. The cells were charged to 384 ampere hours; cells 12A, 12B, 12E and 12F by being charged at 8 amps for 48 hours at 40° C without cooling, the remainder being charged at 10 amps for 24 hours and then at 6 amps for 24 hours.

The cells on discharging at 7.8A to 1.82 volts had discharge durations of 5.72, 5.41, 5.20 and 5.18; 5.99, 5.70, 5.84 and 6.15; 5.68 and 6.51 hours respectively.

Consideration of graphs of initial cell voltage response against time in minutes during electroformation (at 110 volts and 1.4 amps using 1.200 specific gravity sulphuric acid as the electrolyte) of cells made in accordance with Example 1 but containing varying amounts of nitric acid namely 0, 1, 2 and 3% by weight based on electrolyte indicate that as one increases the nitric acid concentration in the electrolyte the initial voltage response of the cell is depressed. Visual observation of the plates indicated that substantial sulphation occurs at the 3% nitric acid level.

However this depression of the initial voltage response can be mitigated by increasing the current used to carry out the formation process to 4.2 amps and/or by applying a constant potential charging sequence. However at nitric acid levels significantly above 1%, e.g., above 2% sulphation is still occurring to a disdvantageous extent. In addition, some crystal formation occurs on the edges of the lamella of the plates and this could lead to crystal growth through the separator and thus to short circuiting of the cell.

Thus for cells of the dimensions quoted for Example 1 it is very much preferred to use nitric acid levels of not more than 1.5% and especially 0.75 to 1.25%, e.g., 0.9 to 1.1%.

Quite apart from crystal growth care must be taken if the formation current is increased. Thus the temperature of the cell will be increased and this results in a diminution of the potential of the negative plate and as a result the nitric acid will be destroyed more rapidly and less will be available to form the positive plate which will thus be less completely converted to lead dioxide.

The relationship between nominal 5 hour capacity and the weight of nitric acid used in forming the cell for cells as described in Example 1, is a linear regression over the range involved of $Y = 0.734 + 0.0312X$; the regression factor $r = 0.804$.

It should be appreciated that this relationship holds for the cells described for Example 1 which have nine plates and is different for cells having 21 plates, 11 negatives and 10 positives and a smaller volume of electrolyte per Ah. The nine plate cells have a relatively high volume of electrolyte to electrode active material. As a result the concentration of nitric acid in the electrolyte is relatively low and the rate at which it is destroyed is relatively low. The excess of negative active material over positive active material is relatively high thus the time taken to fully charge the negatives will be relatively long and thus the rate at which the nitric acid is destroyed is again relatively slow.

For the 21 plate cells the volume of electrolyte is smaller thus one needs to produce a solution which is more concentrated in nitric acid than in the nine plate cells in order to introduce sufficient nitrate ions to convert the positive plates to active form. The excess of negative active material over positive active material is relatively low compared with the nine plate cells, thus the time taken to fully charge the negative plates is relatively short compared with the nine plate cell. The nitrate ions will thus start to be destroyed more rapidly in the 21 plate cell than in the nine plate cell and, due to the higher nitric acid concentration, the rate at which the nitric acid is destroyed is higher than in the nine plate cell. One thus needs to use higher amounts of nitric acid per cell in the 21 plate cell than in the nine plate cell, e.g., instead of 15 grams or 1% on the electrolyte we prefer to use 68 grams or 1.8% on the electrolyte.

The invention is also applicable to larger cells, e.g., 75 Ah in 10 hrs., and 100 Ah in 10 hrs.

What we claim as our invention and desire to secure by Letters Patent is:

1. A method of making a Planté lead acid cell which comprises electrolyte formation of the positive plate in a sulphuric acid solution characterised in that the positives in electrolytically unformed or only partially formed condition are assembled with negative plates and separators into the battery container, the container filled with sulphuric acid electrolyte and an amount of a corroding agent selected from the group consisting of nitric acid and nitrates having a powerful corrosive action on lead under anodic conditions and reducible under the final cathodic condition at the corresponding negative plate to ionic species which do not interfere with the cell reactions, is incorporated into the cell, such as to convert the lead surface to an extended surface area and provide a sufficient mass of lead dioxide at the extended surface, and subjecting the positive plates to anodic conditions so as to convert the lead surface to an extended surface area and provide a sufficient mass of lead dioxide at the said extended surface, the treatment being for a time sufficient under the cathodic conditions at the negative plates, to convert all of the said corroding agent to the non-interfering ionic species.

2. A method as claimed in claim 1 in which the corroding agent is nitric acid.

3. A method as claimed in claim 1 in which the charging conditions are such that the capacity input to the cell is 5 to 8 times the cell 10 hour rated capacity.

4. A method as claimed in claim 1 in which the charging is carried out at a constant potential in which the number of cells is fixed, the voltage is fixed and a fixed resistance is incorporated in the charging circuit so that the circuit cannot deliver in excess of a preset current and so that as the voltage of the cells increases the current in the cells diminishes automatically.

5. A method as claimed in claim 1 in which an excess charging input in the range 1.2:1 to 2:1 is used.

6. A method as claimed in claim 3 in which the cell is charged at a constant current which is 0.10 to 0.25 times the 10 hour rated capacity.

7. A method as claimed in claim 3 in which the electrolyte contains 0.2 to 4.0% weight by volume nitric acid in 1.200 specific gravity sulphuric acid.

8. A method as claimed in claim 7 in which the initial composition for the electrolyte in the container is at least 0.5% by weight of 1.415 specific gravity nitric acid in 1.200 specific gravity battery purity sulphuric acid.

9. A method as claimed in claim 5 in which the final voltage is 2.7 volts and the cell is of 40 ampere hour capacity and the circuit is designed to start at a current of 10 amps so that it will have fallen to 4 amps at the end of the charging sequence, the electrolyte is 1.200 specific gravity sulphuric acid containing 0.8% w/v nitric acid, and the charging is carried out at 40° C, without cooling for 33 to 50 hours until the cell is free of nitric acid.

* * * * *